(12) United States Patent
Singh et al.

(10) Patent No.: US 8,225,283 B2
(45) Date of Patent: *Jul. 17, 2012

(54) METHOD AND APPARATUS FOR ENABLING COLLABORATIVE PRODUCT DEVELOPMENT PROCESSES

(75) Inventors: Man Mohan Singh, Yorktown Heights, NY (US); Sai Zeng, Hawthorne, NY (US); Jose Gomes, Douglaston, NY (US); Ioana Boier-Martin, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 1315 days.

This patent is subject to a terminal disclaimer.

(21) Appl. No.: 11/862,171

(22) Filed: Sep. 26, 2007

(65) Prior Publication Data

US 2009/0083711 A1 Mar. 26, 2009

Related U.S. Application Data

(63) Continuation-in-part of application No. 11/048,001, filed on Jan. 31, 2005, now Pat. No. 7,343,386.

(51) Int. Cl.
G06F 9/44 (2006.01)

(52) U.S. Cl. ........................ 717/121; 717/101

(58) Field of Classification Search ................ 717/121
See application file for complete search history.

(56) References Cited

U.S. PATENT DOCUMENTS

| | | | |
|---|---|---|---|
| 5,341,469 A | | 8/1994 | Rossberg et al. |
| 7,278,130 B2 * | | 10/2007 | Iborra et al. ................. 717/101 |
| 7,343,386 B2 * | | 3/2008 | Gomes et al. ................ 717/100 |
| 7,484,212 B2 * | | 1/2009 | Hellerstein et al. ........... 718/100 |
| 7,574,379 B2 * | | 8/2009 | Flaxer et al. ................ 705/26.81 |
| 2002/0194053 A1 * | | 12/2002 | Barrett et al. ................... 705/10 |
| 2004/0177112 A1 * | | 9/2004 | Goodwin et al. .............. 709/203 |
| 2005/0071806 A1 * | | 3/2005 | Sreedhar ........................ 717/104 |
| 2005/0108022 A1 * | | 5/2005 | Bhattacharya et al. .......... 705/1 |
| 2005/0192979 A1 * | | 9/2005 | Keller et al. ................... 707/100 |
| 2005/0204367 A1 * | | 9/2005 | Minium et al. ................ 719/328 |
| 2006/0041440 A1 * | | 2/2006 | Cheng et al. ...................... 705/1 |
| 2006/0174190 A1 * | | 8/2006 | Gomes et al. ................. 715/511 |
| 2006/0218028 A1 * | | 9/2006 | Kelly et al. ....................... 705/8 |
| 2007/0011659 A1 * | | 1/2007 | Venolia ........................ 717/127 |
| 2007/0162482 A1 * | | 7/2007 | Flaxer et al. .................. 707/101 |

(Continued)

*Primary Examiner* — Li Zhen
*Assistant Examiner* — Marina Lee
(74) *Attorney, Agent, or Firm* — McGinn IP Law Group, PLLC (57) ABSTRACT

A computer-implemented method supporting collaborative product development. A plurality of artifacts associated with the collaborative product development is maintained under revision control in a first repository. Each artifact has a plurality of lifecycle states and each artifact is associated with a first finite state machine (FSM) that defines lifecycle state transitions for the artifacts. A plurality of artifact tuples associated with the collaborative product development is maintained under revision control in a second repository. At least one artifact tuple is comprised of at least one access information providing access to at least one of said plurality of artifacts in the first repository. Each artifact tuple has a plurality of lifecycle states and each artifact tuple is associated with a second finite state machine (FSM) that defines lifecycle state transitions for the artifact tuples. There exists a set of lifecycle state transition mappings which maps all valid lifecycle state transitions for an artifact with desired lifecycle state transitions for an artifact tuple and all valid lifecycle state transitions for an artifact tuple with desired lifecycle state transitions for an artifact. A workflow process relating to an evolution of an artifact or artifact tuple is expressed through sequencing of one or more members of the said lifecycle state transition mappings set.

14 Claims, 8 Drawing Sheets

U.S. PATENT DOCUMENTS

| | | | |
|---|---|---|---|
| 2007/0191979 A1* | 8/2007 | Zeng et al. | 700/97 |
| 2008/0164908 A1* | 7/2008 | Challenger et al. | 326/46 |
| 2008/0189324 A1* | 8/2008 | Keller | 707/103 R |
| 2009/0083711 A1* | 3/2009 | Singh et al. | 717/121 |

* cited by examiner

| | 601 | 602 |
|---|---|---|
| Valid only if tuple is not signed out already | Checked_in -> Checked_out (Artifact) | Signed_in -> Signed_out (Tuple) |
| | | Checked_in -> Checked_out (Artifact) |
| | Checked_in -> Checked_out (Artifact) | Checked_in -> Checked_out (Artifact) |
| | Checked_in -> Released (Artifact) | Checked_in -> Released (Artifact) |
| | | Signed_out -> Signed_in (Tuple) |

METHOD AND APPARATUS FOR ENABLING COLLABORATIVE PRODUCT DEVELOPMENT PROCESSES

The present Application is a Continuation-In-Part of U.S. patent application Ser. No. 11/048,001, filed on Jan. 31, 2005, now U.S. Pat. No. 7,343,386, issued on Mar. 11, 2008.

CROSS-REFERENCE TO RELATED APPLICATIONS

The present Applications are related to the following applications:

U.S. patent application Ser. No. 11/048,001, filed on Jan. 31, 2005, to Gomes et al., entitled "TECHNIQUES SUPPORTING COLLABORATIVE PRODUCT DEVELOPMENT", now U.S. Pat. No. 7,343,386, issued on Mar. 11, 2008; and U.S. patent application Ser. No. 11/350,927, filed on Feb. 10, 2006, to Zeng et al., entitled "METHOD, PROGRAM AND APPARATUS SUPPORTING INTER-DISCIPLINARY WORKFLOW WITH DYNAMIC ARTIFACTS", now abandoned, both assigned to the present assignee, and both incorporated herein by reference.

BACKGROUND OF THE INVENTION

1. Field of the Invention

This invention relates generally to product development and, more specifically, relates to computer-aided product development. The invention describes an implementation of a collaboration process based on synchronization of lifecycle states of constituent product definition artifacts with product lifecycle states.

2. General Background of Invention

This invention disclosure is concerned with methods used in the manufacturing industry to develop complex products such as passenger vehicles. A broad set of disciplines are required to be involved in order to satisfy stakeholders' requirements and deliver the features that customers desire. These disciplines typically include engineering disciplines (e.g., electrical, mechanical, materials, chemical, software, and requirement engineering), manufacturing, maintenance, as well as business management disciplines (e.g., project management, finance, human resources). Organizations focused on their respective specific discipline have traditionally matured specific practices and information technologies for business process automation and lifecycle management of constituent product definition artifacts.

Furthermore, because a holistic approach to product development is becoming a competitive differentiator, there has been a recent emphasis on capturing and using the traceability information that links digital artifacts owned by different disciplines but involved in integrated product level development processes.

However, before it can be used to the benefit of holistic product development processes, this traceability information needs to be created and its accuracy and integrity maintained across the entire lifecycle of the product being developed.

Thus, a need exists for a method to create and maintain traceability information throughout the lifecycle of product being developed, particularly as it relates to complex products that require involvement by various disciplines during the lifecycle.

SUMMARY OF THE INVENTION

The current invention provides a method to do so, by extending the methods of the two above-identified related co-pending applications to further incorporate concepts of finite state machines (FSMs) into the artifacts and artifact tuples related to the development process and the product definition. However, to provide a background for the present invention, the two above-identified co-pending applications will be briefly described, as follows.

Business enterprises use various repository systems (such as Product Data Management (PDM), Software Configuration Management (SCM), Requirements Management (RM), etc.) to support product lifecycle. These repository systems provide extensive capabilities related to the specific domain of application (such as Computer Aided Design, Computer Aided Software Engineering, Requirements Engineering, etc) and, sometimes, specialized capabilities related to 'target' product market segment (such as a PDM system designed to support special needs of consumer electronics product versus one for automotive products).

A common functionality across this wide spectrum of repository systems is the capability to provide controlled and secure access to product artifacts that are relevant to a specific domain of application. An important feature of this capability is providing support for concurrent development of product artifacts and a trace of evolutionary history of a product artifact from configuration management and change management perspectives. An obvious fact is that the repository systems also provide support for business processes relevant to a specific domain of application.

In terms of keeping track of evolutionary history of artifacts under the control of repository systems, most such systems use the concept of graphs.

The first copending application includes a collection of methods for enabling interdisciplinary collaboration by creating traceability between product development processes and requisite product artifacts and managing the integrity of traceability information under the control of a traceability data repository such as, for example, the System Data Management (SDM) repository presented in the invention disclosure Ser. No. 11/048,001, the entire contents of which are incorporated herein by reference.

These methods comprise a set of atomic operations, to create and evolve artifacts and associated traceability information. Typically, these atomic operations are the fine grained lifecycle operations that can be applied to the artifacts and traceability information.

Therefore, these methods also comprise a set of compound operations, composed of atomic and other compound operations that define fine grained business processes that may be jointly performed on the artifacts and traceability information so as to maintain the integrity in variants of the traceability information.

These fine grained business processes are exercised by the development teams in a way consistent with their institutional product development practices. Typically, collaborative product development processes that involve a larger set of teams also touch a larger number of repositories and traceability information. Consequently, they also require more sophisticated business processes to maintain more complex product artifact selection rules.

The second of the two above-identified co-pending applications describes how product development related workflow activity descriptions and artifact configuration selection rules are used and maintained themselves under revision control during product development.

The present invention further extends the concepts of the two co-pending applications by describing how lifecycle operations on the traceability tuples and associated artifacts described therein are synchronized using concepts of coupling of corresponding finite state machines. As taught in the present invention, the valid lifecycle states of an artifact under the control of a repository system and rules for lifecycle state transitions can be encapsulated in a finite state machine. Various types of operations that affect the lifecycle state of an artifact or the lifecycle graph of an artifact as a result of authoring operations or business process support can be expressed in a state transition diagram of the associated finite state machine or as a set of simple graph re-write rules.

Accordingly, in a first exemplary aspect of the present invention, described herein is a computer-implemented method supporting collaborative product development, including maintaining under revision control, in a first repository, a plurality of artifacts associated with the collaborative product development, at least one artifact having a plurality of lifecycle states, wherein each artifact is associated with a first finite state machine (FSM) that defines lifecycle state transitions for the artifact.

In a second exemplary aspect of the present invention, also described herein is an apparatus including a memory interface for maintaining under revision control, in a first repository, a plurality of artifacts associated with a collaborative product development, each artifact having a plurality of lifecycle states, wherein at least one artifact is associated with a first finite state machine (FSM) that defines lifecycle state transitions for the artifact, and a graphical user interface (GUI) to permit a user to control the plurality of artifacts in the first repository.

In a third exemplary aspect of the present invention, also described herein is a machine-readable medium tangibly embodying a program of machine-readable instructions executable by a digital processing apparatus to perform the computer-implemented method described above.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Referring now to the drawings, and more particularly to FIGS. 1-10, an exemplary embodiment of the method and structures of the present invention will now be described.

As a preliminary matter, for purpose of the present discussion, the term "artifacts" is intended to refer to finite and identifiable pieces of digital information produced, consumed or transformed by product development processes. For instance, an artifact could be an abstraction, such as a CAD file, a digital representation of a process of simulating a product, or a record in a database of a design specification.

Figure 1:
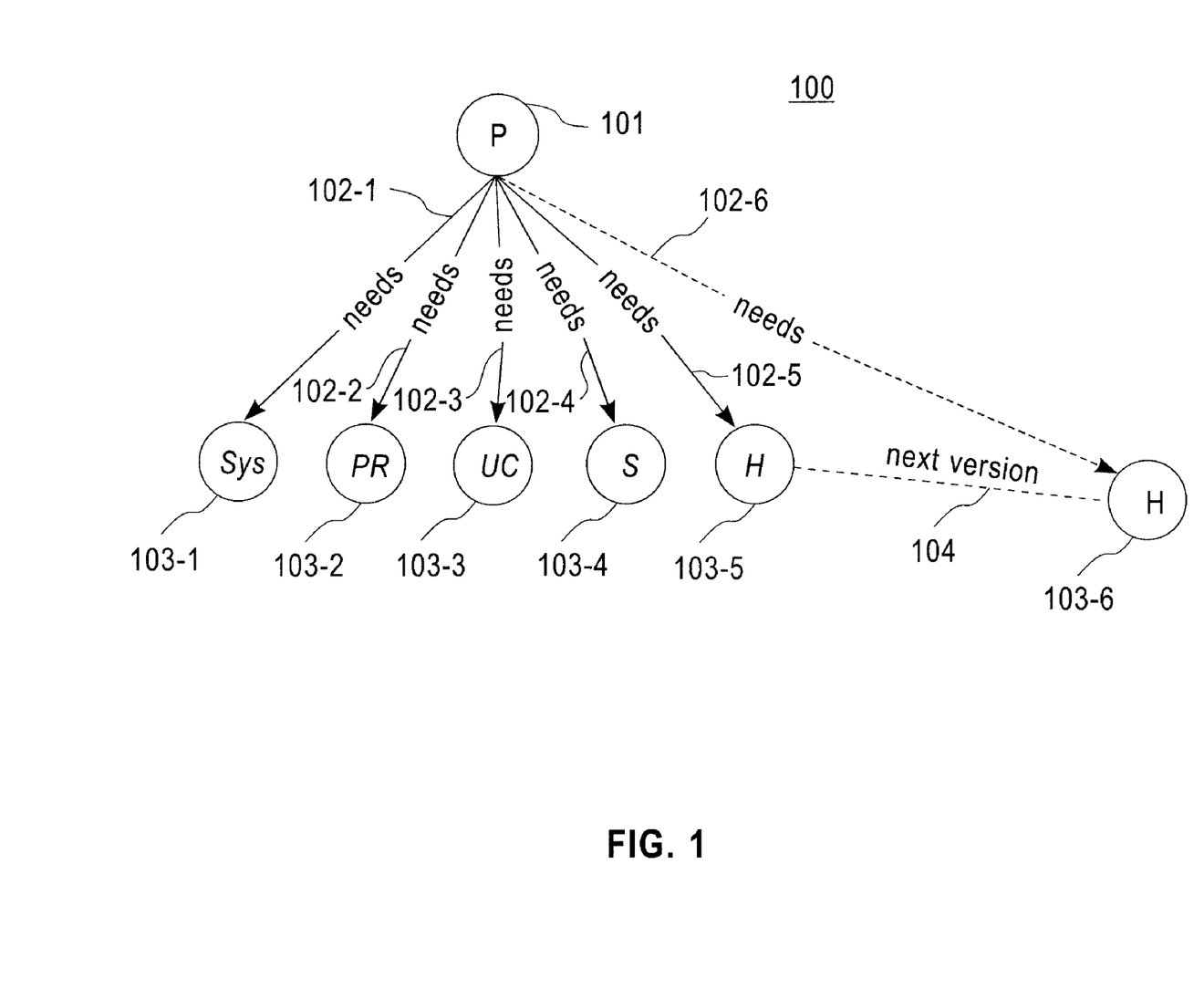
FIG. 1 illustrates a visual representation of one artifact tuple linking a given product development process to a set of multi-disciplinary artifacts needed to execute that process.

The first of the two co-pending applications describes the concepts of an artifact tuple with its associated artifacts. FIG. 1 shows exemplarily the concept 100 of using artifacts as associated with different activities of a development project. This first co-pending application also describes how artifact tuples and artifacts are used in support of systems engineering based product development processes.

Thus, for example, FIG. 1 shows a given inter-disciplinary product development process P 101 (e.g., an analysis process) that might involve (as illustrated by references 102-1 through 102-5) loading a software program S 103-4 on hardware H 103-5, executing the software program S 103-4 in the context of a use case UC 103-3 and verifying that the associated performance requirements PR 103-2 are satisfied. The intended relationships between S 103-4, H 103-5, UC 103-3, and PR 103-2 are specified, for example, in a SysML model SYS 103-1.

As shown in FIG. 1, a problem addressed by this first co-pending application arises when a next version 104 of hardware H 103-6 is created, so that the entire system P 101 knows that hardware H 103-5 has been updated to H 103-6.

Figure 2:
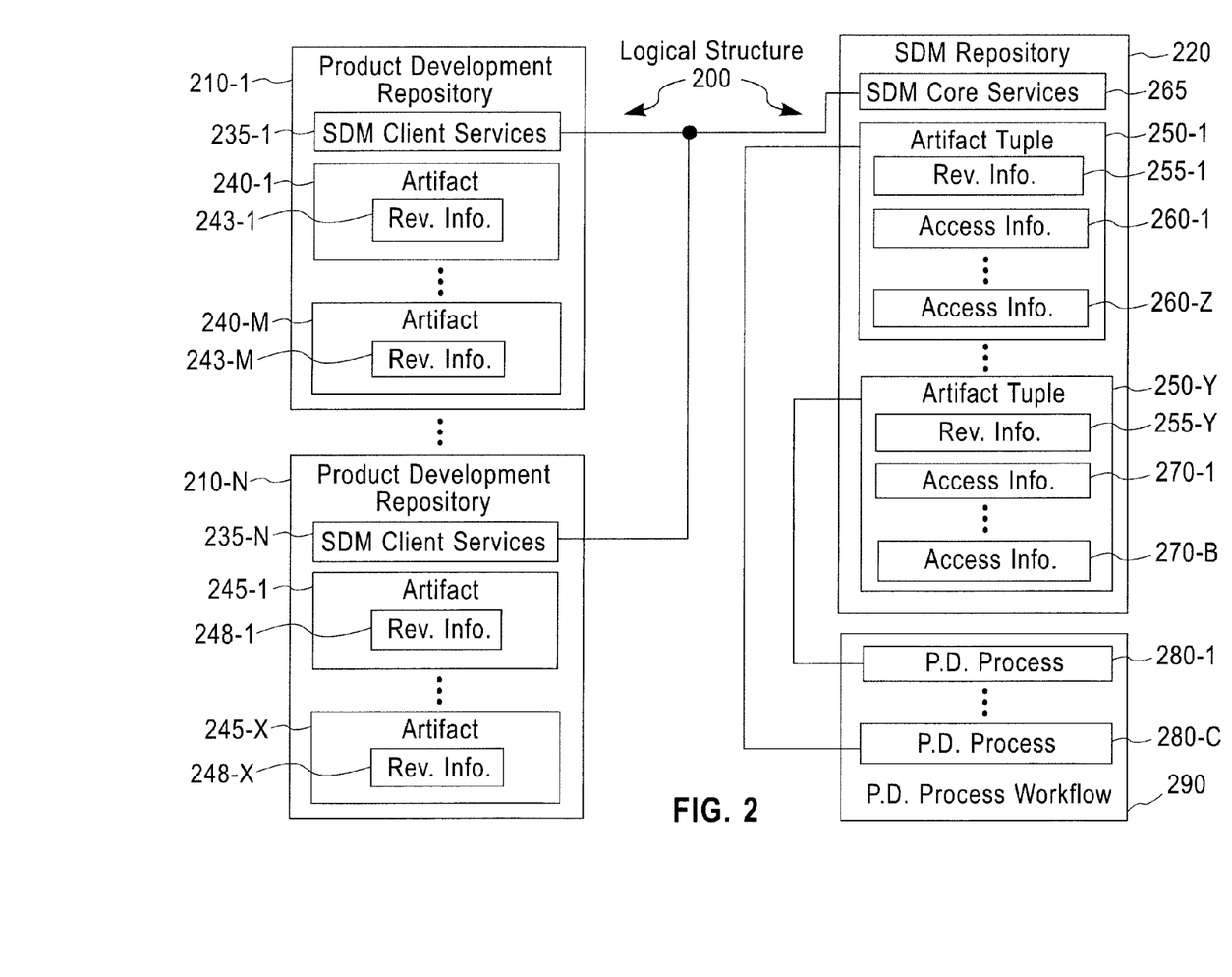
FIG. 2 illustrates a logical structure 200 for a product development information system including an SDM repository, other product development repositories, and product development process workflow and illustrating the storage of artifacts and artifact tuples, as related to product development.

To address such problems, the first co-pending application teaches how to generate, store, and update artifacts related to such product developments, as exemplarily shown in the logic structure 200 of FIG. 2, and typically implemented as a distributed computer system comprising a plurality of computers or computer systems. The system exemplarily includes product development repositories 210-1 through 210-N, SDM repository 220, and product development process workflow repository 290.

Each product development repository, exemplarily demonstrated by repository 210-1, comprises SDM client services objects 235-1 and artifacts 240-1 through 240-M. In this example, each artifact 240 comprises revision information 243. The SDM repository 220 includes traceability information organized according the prescribed product development processes 280 supported by the SDM repository 220. For each prescribed product development process 280, the SDM repository 220 records links (e.g., access information 260, 270, and links (not shown)) to the set of artifacts 240, 245 (e.g., seen as a concrete resource) used to implement the product development process 280. The product development process workflow 290 also associates (e.g., under control of a user) a product development process 280 to one or more artifact tuples 250. In the example of FIG. 2, the product development process 280-1 is associated with the artifact tuple 250-Y, while the product development process 280-C is associated with the artifact tuple 250-1. Note that the product development processes 280 can be associated with multiple artifact tuples 250 and two or more product development processes 280 may be associated with a given artifact tuple 250, if desired.

Figure 3:
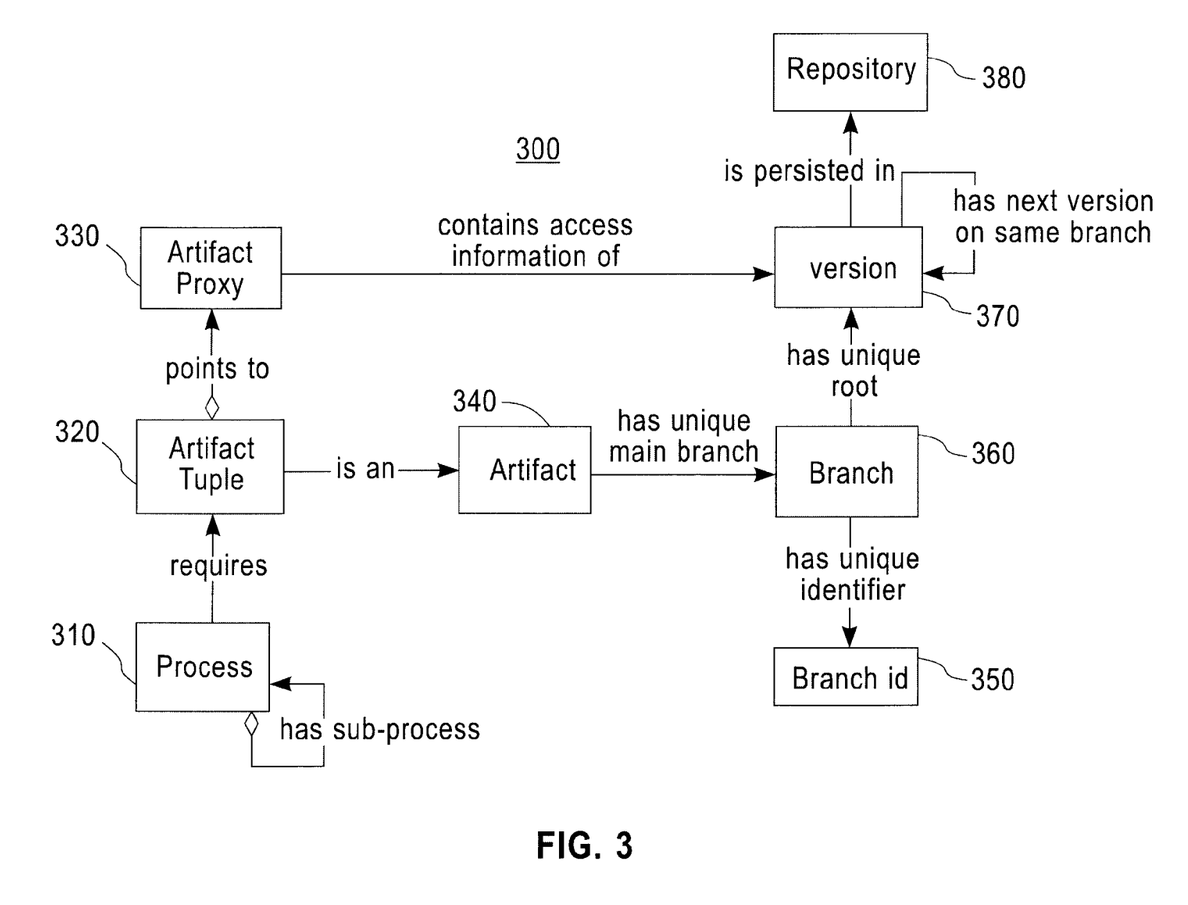
FIG. 3 illustrates an exemplary SDM data model for an exemplary SDM system in accordance with an exemplary embodiment of the present invention.

FIG. 3 shows an SDM data model 300 demonstrating how workflow activity is associated with the tuples. The SDM data model 300 comprises a process class 310, an artifact tuple class 320, an artifact proxy class 330, an artifact 340, a branch identifier (Branchild) class 350, a branch class 360, a version class 370, and a repository class 380. In the example of FIG. 3, the artifact tuple 320 points to artifact proxies 330. Each artifact proxy 330 comprises additional access information for an artifact (implemented as a "version" 370 in this example because each artifact is assumed to have version). The version 370 is persisted in the repository 380, which could be a product development repository or an SDM repository.

The second above-identified co-pending application enhanced the process described in the first co-pending application by adding the concepts of artifact configuration selection rules and associated workflow activity descriptions for an overall product development process.

The present invention extends the concepts described in the two above-identified co-pending applications to further include concepts of finite state machines, summarized as follows:

(1) Each artifact is associated with a finite state machine (FSM). The FSM describes valid lifecycle state transitions for the artifact. Also, associated with each valid lifecycle state transition is a set of actions (including "no action") that operate on lifecycle graph of the artifact (for example, actions associated with a valid state transition may describe when a new revision of the state artifact is created and the starting lifecycle state of the new revision) (see FIG. 4A, 4B and 4C (2) Each artifact tuple is associated with a finite state machine (FSM). The FSM describes valid lifecycle state transitions for the said artifact tuple. Also, associated with each valid lifecycle state transition is a set of actions (including no action) that operate on lifecycle graph (see FIG. 5A and 5B) of the said artifact tuple (for example, actions associated with a valid state transition may describe when a new revision of the said artifact tuple is created, the starting lifecycle state of the new revision, and effect (if any) on parent and children artifact tuples).

(3) There exists a set of lifecycle state transition mappings where each member of the set maps (see FIG. 6):

(3a) A valid lifecycle state transition for an artifact tuple with a sequence of ZERO or MORE valid lifecycle state transitions for the artifacts referenced in the said artifact tuple.

(3b) A valid lifecycle state transition for an artifact with a sequence of ZERO or MORE valid lifecycle state transitions for the artifact tuples which reference the said artifact.

(4) Workflow processes that relate to evolution of artifact tuples or artifacts are constructed through sequencing of one or more members of lifecycle state transition mappings set. Examples of such workflow processes are check-in, check-out, create baseline, release, etc., (see FIG. 7).

Figure 4A:
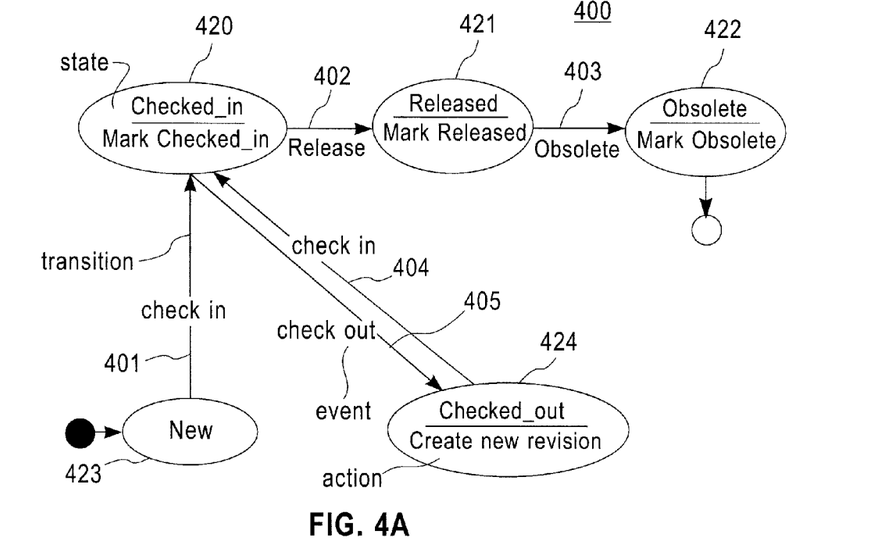
FIG. 4A illustrates an exemplary Finite State Machine for a design artifact.
Figure 4B:
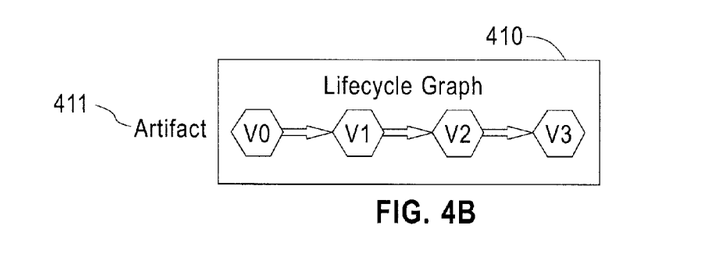
FIG. 4B illustrates an exemplary lifecycle graph of an artifact.
Figure 4C:
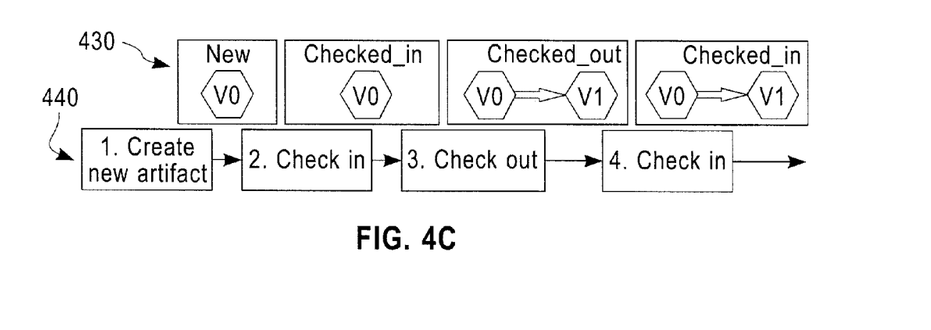
FIG. 4C illustrates an exemplary evolution of artifact lifecycle graph as a result of authoring operations under the control of FSM in FIG. 4A.

Returning now to FIGS. 4A through 4C, each artifact of the present invention is associated with a finite state machine (FSM), such as the example FSM 400 shown in FIG. 4A. The FSM 400 shown in FIG. 4A shows four states 420-424 interconnected by the FSM transitions 401-405. Also, associated with each valid lifecycle state transition is a set of actions (including "no action") that operate on lifecycle graph of the artifact. For example, actions associated with a valid state transition may describe when a new revision of the artifact is created and the starting lifecycle state of the new revision, as shown in the artifact lifecycle graph 410 as shown in FIG. 4B indicating creation of versions V0 through V3 FIG. 4C shows the detailed activities from enduser perspective and corresponding evolution in artifact lifecycle graph in accordance with FSM 400.

Figure 5A:
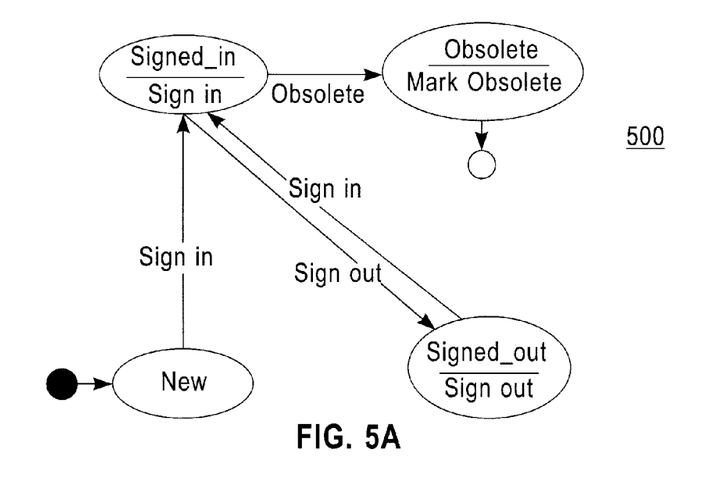
FIG. 5A illustrates an exemplary Finite State Machine for a tuple.
Figure 5B:
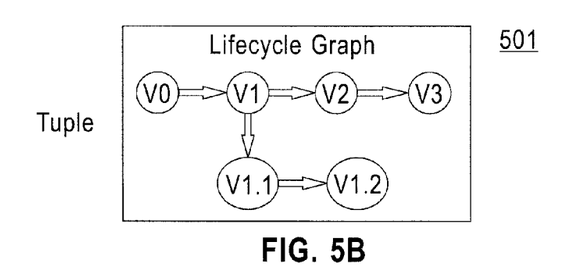
FIG. 5B illustrates an exemplary lifecycle graph of a tuple.

FIG. 5A shows how each artifact tuple is similarly associated with a finite state machine (FSM) 500, which describes corresponding valid lifecycle state transitions for the artifact tuple. With each valid lifecycle state transition, there is also an associated set of actions (including "no action") that operate on the lifecycle graph of the artifact tuple. For example, actions associated with a valid state transition may describe when a new revision of the artifact tuple is created, the starting lifecycle state of the new revision, and effect (if any) on parent and children artifact tuples, as shown in the tuple lifecycle graph 501 as shown in FIG. 5B indicating creation of versions V0 through V3, and versions V1.1 through V1.2.

Figure 6:
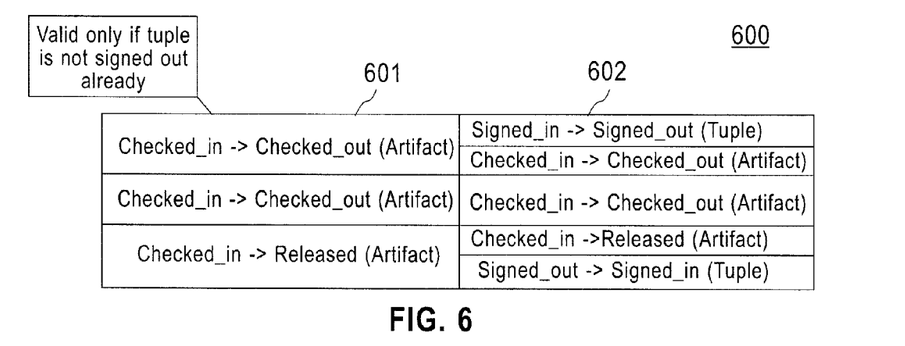
FIG. 6 illustrates exemplary lifecycle state transition mappings.

FIG. 6 shows exemplarily the mapping 600 between lifecycle state transitions 601 of an artifact and the corresponding lifecycle state transitions 602 for an artifact tuple for the examples of FIGS. 4A through 5B. The purpose of this mapping is to inter-link state transitions of a tuple to prescribed state transitions of associated artifacts and vice versa.

Figure 7:
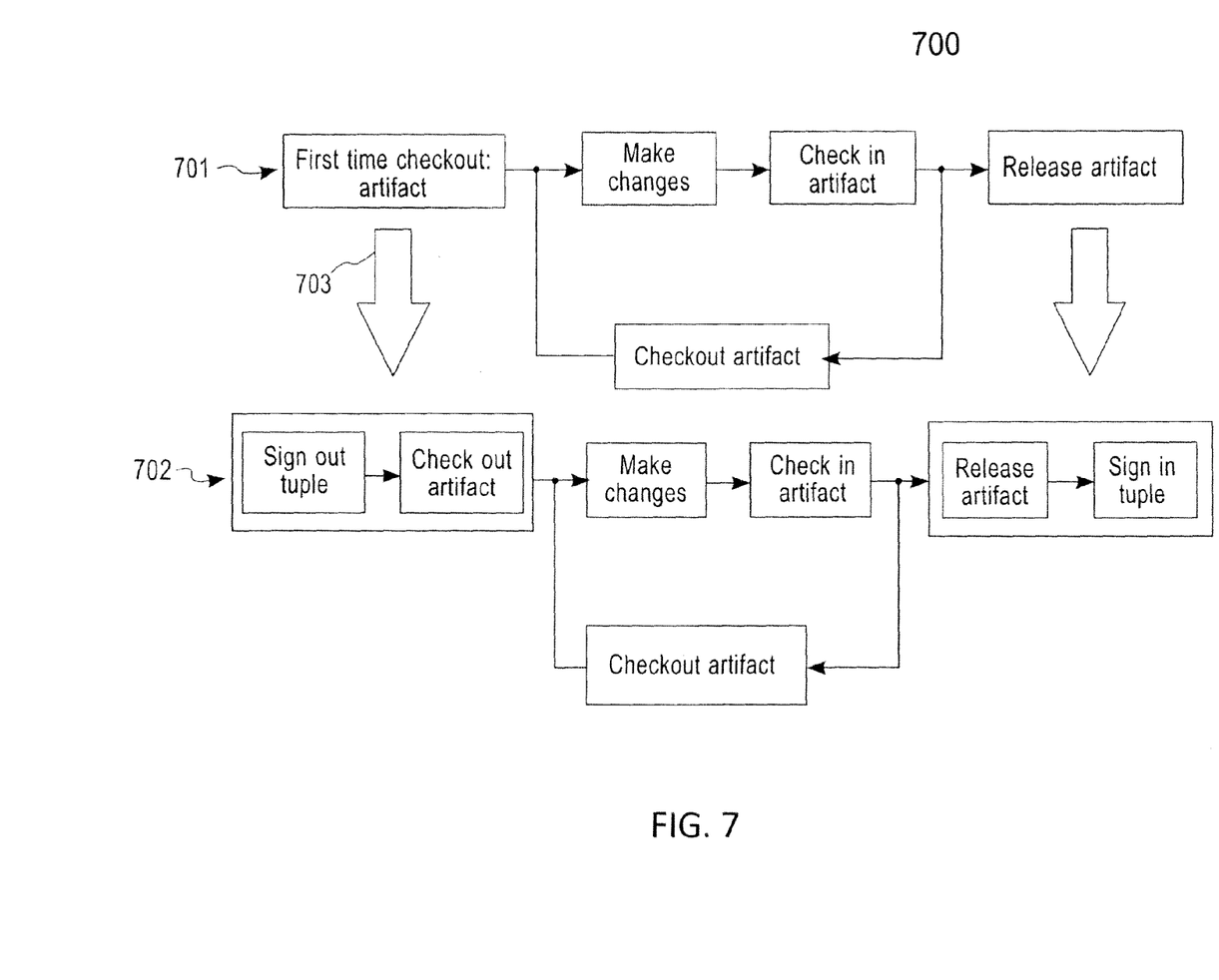
FIG. 7 illustrates an exemplary usage of lifecycle state transition mappings.

FIG. 7 shows workflow processes 700 related to the FSMs shown in FIGS. 4A and 5A, showing the evolution of artifact tuples or artifacts. As mentioned earlier, examples of such workflow processes are check-in, check-out, create baseline, release, etc.

The upper portion 701 shows the user perspective of using the artifacts, whereas the lower portion 702 shows the underlying activity with the artifacts and the tuples. The arrow 703 represent the mapping table described exemplarily shown in FIG. 6.

Exemplary Software Implementation

Although the FSMs and their associated mappings could be implemented in various ways, including either hardware or software, one exemplary and non-limiting embodiment that correlates well with a software package that implements either of the two co-pending applications would be that of using subroutines that define the FSMs for each artifact/artifact tuple and associated mappings, with data associated with present and past states being stored in memory for retrieval at the next usage. Alternatively, a data structure defined by a subroutine could be instantiated as the FSM for each artifact/artifact tuple and their associated mapping.

Figure 8:
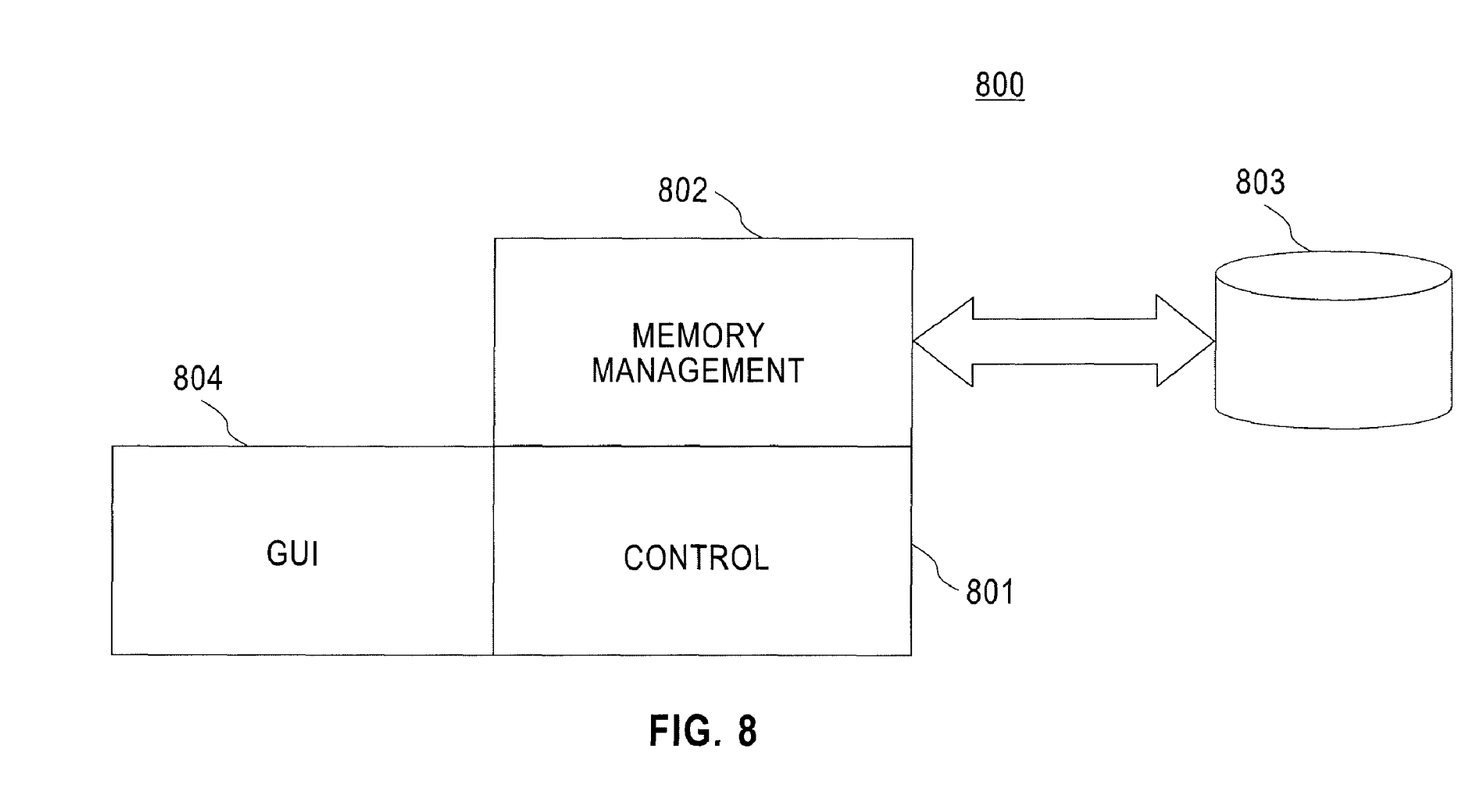
FIG. 8 illustrates a block diagram 800 of an exemplary embodiment incorporating the concepts of the present invention as implemented in software as a section of a larger program used to implement the concepts of the two above-identified co-pending applications.

FIG. 8 shows an exemplary block diagram 800 of such embodiments wherein control module 801 would be a subroutine that controls the instantiation and subsequent control of a data structure or other type of representation of the FSMs such as, for example, a state table or a set of "if then, else" statements. Memory module 802 interfaces with memory 803 to save and retrieve data related with each artifact/artifact tuple representation. Graphical user interface 804 allows a user to initiate and control the FSM transitions (e.g., enter data for an artifact or tuple), as well as control the tool implementing the concepts of the present invention.

Exemplary Hardware Implementation

Figures 9, 10:
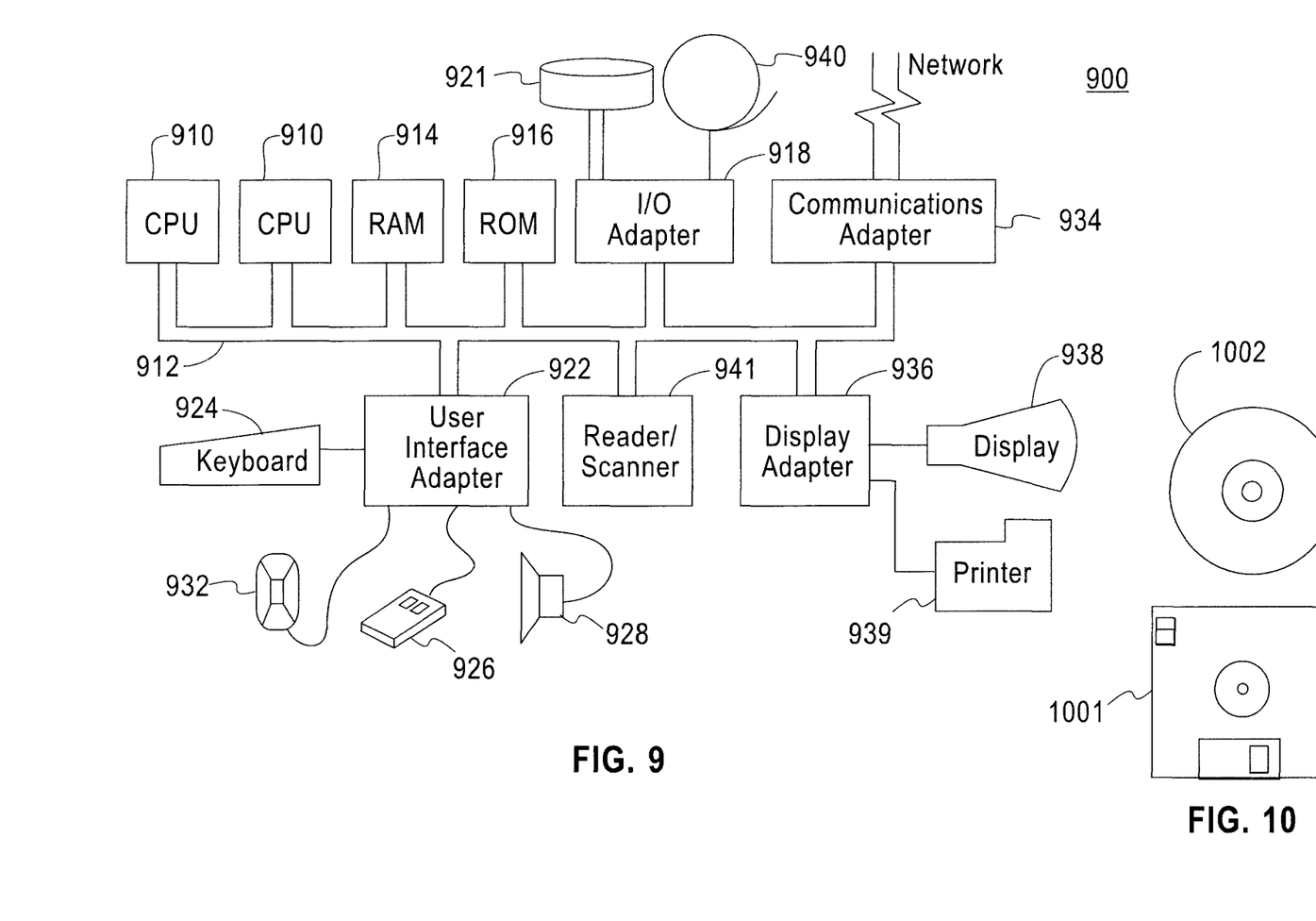
FIG. 9 illustrates an exemplary hardware/information handling system 900 for incorporating the present invention therein.
FIG. 10 illustrates a signal bearing medium 1000 (e.g., storage medium) for storing steps of a program of a method according to the present invention.

FIG. 9 illustrates a typical hardware configuration of an information handling/computer system in accordance with the invention and which preferably has at least one processor or central processing unit (CPU) 911.

The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communication adapter 934 for connecting an information handling system to a data processing network, the Internet, an Intranet, a personal area network (PAN), etc., and a display adapter 936 for connecting the bus 912 to a display device 938 and/or printer 939 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 911 and hardware above, to perform the method of the invention.

This signal-bearing media may include, for example, a RAM contained within the CPU 911, as represented by the fast-access storage for example. Alternatively, the instructions may be contained in another signal-bearing media, such as a magnetic data storage diskette 1000 (FIG. 10), directly or indirectly accessible by the CPU 911.

Whether contained in the diskette 1000, the computer/CPU 911, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media. It is also noted that the machine-executable process can also be defined by a transmission of machine-readable instructions, such as using digital and analog and communication links and wireless. In an illustrative embodiment of the invention, the machine-readable instructions may comprise software object code.

The invention claimed is:

1. A computer-implemented method supporting collaborative product development, said method comprising:
   maintaining under revision control, in a first repository, a plurality of artifacts associated with said collaborative product development, at least one of said artifacts having a plurality of lifecycle states, wherein at least one of said artifacts is associated with a first finite state machine (FSM) that defines lifecycle state transitions for said artifact, at least one said lifecycle state transition of said first FSM being associated with a set of actions that define possible actions of said artifact;
   maintaining under revision control, in a second repository, a plurality of artifact tuples, at least one first artifact tuple comprising first access information providing access to at least one of said plurality of artifacts in said first repository, at least one of said artifact tuple having a plurality of lifecycle states, wherein at least one of said artifact tuples is associated with a second finite state machine (FSM) that defines lifecycle state transitions for said artifact tuple, at least one of said lifecycle state transition of said second FSM being associated with a set of actions that define possible actions of said artifact tuple; and
   providing a set of lifecycle state transition mappings, at least one member of the set mapping a valid lifecycle state transition for an artifact tuple with one or more valid lifecycle state transitions for an artifact.

2. The method of claim 1, further comprising:
   providing a set of lifecycle state transition mappings, at least one member of the set mapping a valid lifecycle state transition for an artifact with one or more valid lifecycle state transitions for an artifact tuple.

3. The method of claim 2, further comprising:
   constructing a workflow process relating to an evolution of an artifact or an artifact tuple expressed through sequencing of one or more members of said lifecycle state transition mappings set.

4. The method of claim 3, said workflow process thereby providing a synchronization of lifecycle states of a constituent product definition artifacts with product lifecycle states.

5. The method of claim 3, said workflow process comprising one of a check-in process, a check-out process, a create baseline process, and a release process.

6. The method of claim 1, wherein said FSM is implemented in one of a:
   data structure;
   state table; and
   set of nested software instructions.

7. An apparatus, comprising:
   a memory interface for interacting with a repository;
   a controller for maintaining under revision control, in a first repository, a plurality of artifacts associated with a collaborative product development, at least one of said artifacts having a plurality of lifecycle states, wherein at least one of said artifacts is associated with a first finite state machine (FSM) that defines lifecycle state transitions for said artifact, said controller defining an association such that at least one of said lifecycle state transition of said first FSM is associated with a set of actions that define possible actions of said artifact; and
   a graphical user interface (GUI) to permit a user to control said plurality of artifacts in said first repository,
   said controller further permitting to maintain under revision control, in a second repository, a plurality of artifact tuples, at least one first artifact tuple comprising first access information providing access to at least one of said plurality of artifacts in said first repository, with a capability to further comprise second access information, at least one of said artifact tuples being associated with a second finite state machine (FSM) that defines lifecycle state transitions for said artifact tuple, at least one of said lifecycle state transition of said second FSM being associated with a set of actions that define possible actions of said artifact tuple,
   said controller further maintaining a set of lifecycle state transition mappings, at least one member of the set mapping a valid lifecycle state transition for an artifact tuple with one or more valid lifecycle state transitions for an artifact.

8. The apparatus of claim 7, said controller further maintaining a set of lifecycle state transition mappings, at least one member of the set mapping a valid lifecycle state transition for an artifact with one or more valid lifecycle state transitions for an artifact tuple.

9. The apparatus of claim 8, wherein said controller further constructs a workflow process relating to an evolution of an artifact tuple or artifact through sequencing of one or more members of said lifecycle state transition mappings set.

10. The apparatus of claim 7, wherein said FSM is implemented in one of a:
   data structure;
   state table; and
   set of nested software instructions.

11. A non-transitory machine-readable storage medium tangibly embodying a program of machine-readable instructions executable by a digital processing apparatus to perform a computer-implemented method supporting collaborative product development, said method comprising:
   maintaining under revision control, in a first repository, a plurality of artifacts associated with said collaborative product development, at least one of said artifacts having a plurality of lifecycle states, wherein at least one of said artifacts is associated with a first finite state machine (FSM) that defines lifecycle state transitions for said artifact, at least one of said lifecycle state transitions of said first FSM being associated with a set of actions that define possible actions of said artifact;
   maintaining under revision control, in a second repository, a plurality of artifact tuples, at least one first artifact tuple comprising first access information providing access to at least one of said plurality of artifacts in said first repository, at least one of said artifact tuple being associated with a second finite state machine (FSM) that defines lifecycle state transitions for said artifact tuple, at least one of said lifecycle state transitions of said second FSM being associated with a set of actions that define possible actions of said artifact tuple; and
   maintaining a set of lifecycle state transition mappings, at least one member of the set mapping a valid lifecycle state transition for an artifact tuple with one or more valid lifecycle state transitions for an artifact.

12. The storage medium of claim 11, said method further comprising:
   maintaining a set of lifecycle state transition mappings, at least one member of the set mapping a valid lifecycle state transition for an artifact with one or more valid lifecycle state transitions for an artifact tuple.

13. The storage medium of claim 12, said method further comprising:
   constructing a workflow process relating to an evolution of an artifact tuple or an artifact through sequencing of one or more members of said lifecycle state transition mappings set.

14. The storage medium of claim 11, wherein said FSM is implemented in one of a:
   data structure;
   state table; and
   set of nested software instructions.

* * * * *